United States Patent [19]
Kikura et al.

[11] 4,116,190
[45] Sep. 26, 1978

[54] TROCHOIDAL ROTARY PISTON ENGINE WITH BYPASS OF COMPRESSED MIXTURE TO EXHAUST CHAMBER

[75] Inventors: Katsuaki Kikura, Japan; Hiroshi Nomura, Takehara; Kiyohiro Takeda, Hiroshima, all of Japan

[73] Assignee: Toyo Kogyo Co. Ltd., Hiroshima

[21] Appl. No.: 754,550

[22] Filed: Dec. 27, 1976

[30] Foreign Application Priority Data

Dec. 27, 1975 [JP] Japan .............................. 51-157864
Feb. 24, 1976 [JP] Japan .............................. 51-19708

[51] Int. Cl.$^2$ ....................... F02B 53/00; F02B 55/14
[52] U.S. Cl. .................................. 123/202; 123/242
[58] Field of Search ............... 123/8.07, 8.45; 60/901

[56] References Cited

U.S. PATENT DOCUMENTS

| | | | |
|---|---|---|---|
| 3,168,078 | 2/1965 | Lamm ............................... | 123/8.09 |
| 3,446,190 | 5/1969 | Bensinger et al. .................. | 123/8.01 |
| 3,528,084 | 9/1970 | Hohenlohe ......................... | 123/8.07 |
| 3,872,839 | 3/1975 | Russell et al. ..................... | 60/901 |
| 3,939,655 | 2/1976 | Ruf et al. .......................... | 123/8.45 |

FOREIGN PATENT DOCUMENTS 1,576,194 5/1970 Fed. Rep. of Germany ......... 123/8.07
1,123,503 8/1968 United Kingdom .................. 123/8.45

*Primary Examiner*—John J. Vrablik
*Attorney, Agent, or Firm*—Fleit & Jacobson

[57] ABSTRACT

Rotary piston engine comprising a casing and a substantially tri-angular rotor disposed in the trochoidal cavity of the casing. The casing is provided with a take-out port for drawing compressed air from the compressing working and a discharge port located to open to the exhaust working chamber. The take-out port is connected through a throttle-controlled valve with the discharge port and so located that squish flow directed to the ignition area is weakened by taking out a part of the compressed gas through the take-out port.

13 Claims, 9 Drawing Figures

TROCHOIDAL ROTARY PISTON ENGINE WITH BYPASS OF COMPRESSED MIXTURE TO EXHAUST CHAMBER

The present invention relates to rotary piston engines and more particularly to rotary piston engines having means for drawing compressed gas from working chambers in idling and light load engine operations.

Conventional type of rotary piston engines comprise a casing which includes a rotor housing having an inner wall of trochoidal configuration and a pair of side housings gas-tightly secured to the opposite sides of the rotor housing to define a rotor cavity of trochoidal configuration, and a substantially polygonal rotor disposed in the rotor cavity for rotation with apex portions in sliding contact with the inner wall of the rotor housing to define working chambers between the inner wall of the rotor housing and flanks of the rotor. Each working chamber is therefore displaced along the inner wall of the rotor housing as the rotor rotates and has a volume which varies in response to the rotation of the rotor through intake, compressing, expansion and exhaust strokes. The casing is formed with one or more intake parts located to open to the working chamber which is in the intake stroke so that air or air-fuel mixture is introduced therein. The casing is also formed with an exhaust port located to open to the working chamber which is in exhaust stroke.

In this type of rotary piston engines, it has been experienced that a certain amount of combustion gas is carried-over into the intake working chamber resulting in a dilution of air-fuel mixture. Such dilution of air-fuel mixture often causes misfiring and possibly results in rough engine operation. Such carry-over of combustion gas is mainly caused by the fact that the rotor drives residual gas toward the intake area of the engine. Referring to a specific working chamber, a certain amount of combustion gas remains therein at the end of the exhaust stroke without being completely exhausted through the exhaust port. Such residual combustion gas is carried by the rotating rotor to a position where the intake stroke takes place and mixed with the intake air or air-fuel mixture introduced through the intake port into the intake working chamber.

Combustion gas is additionally introduced into the intake working chamber by overflow from the exhaust port. As well known in the art, in this type of rotary piston engines, there is a so-called overlap period wherein a working chamber simultaneously communicates with both of the intake and exhaust ports. It has widely been recognized that in this overlap period the combustion gas in the exhaust port is allowed to flow from the exhaust port into the intake working chamber. The absolute amount of combustion gas thus carried-over into the intake working chamber will not significantly change in response to a change in the charging efficiency of the engine. Therefore, the carry-over ratio, that is, the ratio of the amount of such carried-over combustion gas to the amount of total intake gas increased substantially proportionally to a decrease in the charging efficiency. On the other hand, the allowable limit of the carry-over ratio, which may be defined as the minimum carry-over ratio under which number of misfire can be maintained below 10 times per minutes, will be decreased in response to a decrease in the charging efficiency and there will be an abrupt decrease in the allowable limit of the carry-over ratio under a lower range of the charging efficiency.

Thus, it has been recognized that the actual carry-over ratio exceeds the allowable limit at and below a certain value of the charging efficiency. Under such conditions, there will be a significant increase in the possibility of misfire and in some adverse circumstances the engine may fail to operate. In order to prevent the problems, it has been required to maintain the charging efficiency at an adequately large value so that the actual carry-over ratio is always smaller limit.

Through recent improvements in internal combustion engines in respect of engine efficiencies, particularly in gas-tightness and frictional resistances, the requirements on the charging efficiency in idling operation have been moderated. However, the charging efficiency in idling operation has had to be maintained at a relatively high value for the purpose of preventing misfire.

It has therefore been proposed to draw a part of compressed gas in the idling and light load engine operations out of the working chamber in the compression stroke so that a relatively large amount of air can be introduced into the working chamber during the intake stroke. For example, in the British Pat. No. 1,123,503, there is disclosed a rotary piston engine having a rotor housing provided with a compressed gas outlet port. The gas outlet port is located in the vicinity of the majour axis of the trochoid and associated with a valve which is interconnected with the engine throttle valve. The compressed gas thus taken out through the outlet port is returned through a conduit to the intake area of the rotor housing.

In the U.S. Pat. No. 3,168,078, there is also disclosed a rotary piston engine which includes a rotor housing provided with a V-shaped passage in the vicinity of the majour axis of trochoid. The V-shaped passage opens at one end to the compression zone and at the other end to the intake zone of the working chambers so that, when one apex portion of the rotor passes between the opposite ends of the V-shaped passage, compressed gas is allowed to pass from the preceding working chamber through the V-shaped passage to the succeeding working chamber.

In these known arrangements, it has been considered that the amount of intake air can be increased to such an extent that the carried-over combustion gas is decreased to prevent misfiring. However, experiences have shown that these arrangements are not sufficient to prevent misfiring without fail.

The inventors have found that such misfiring in the idling and light load engine operations is caused not only by the aforementioned residual combustion gas which is carried into the intake zone as the rotor rotates, but also by squish flow which is produced in the compression working chamber. Such squish flow is directed in the direction of rotor rotation and may often extinguish combustion flames just produced around the ignition plugs.

It is therefore an object of the present invention to provide rotary piston engines with effective means for preventing misfire in idling and light load engine operations.

Another object of the present invention is to provide rotary piston engines which are provided with means for taking out compressed gas from compression working chambers.

A further object of the present invention is to provide rotary piston engines having means for decreasing the amount of combustion gas which is allowed to enter the intake combustion chamber.

According to the present invention, the above and other objects can be accomplished by a rotary piston engine comprising a casing which includes a rotor housing having an inner wall of trochoidal configuration and a pair of side housings secured to the opposite sides of the rotor housing to define a rotor cavity of trochoidal configuration having a major and a minor axes, and a substantially polygonal rotor disposed in the rotor cavity for rotation with apex portions in sliding contact with the inner wall of the rotor housing to define, between the inner wall of the rotor housing and flanks of the rotor, working chamber which are displaced along the inner wall of the rotor housing as the rotor rotates with volumes varying in response to the rotation of the rotor through intake, compression, expansion and exhaust strokes, intake port means provided in said casing to open to one of the working chambers which is in the intake stroke, exhaust port means provided in said casing to open to another working chamber which is in the exhaust stroke, ignition means provided in the casing for igniting compressed air-fuel mixture, mixture take-out port means provided in said casing to open to the working chamber which is at the end of the compression stroke wherein the working chamber possesses the minimum volume, said take-out port means being located at a side of the minor axis of the trochoid opposite to the rotor rotation to draw a part of the compressed mixture in the working chamber in the compression stroke. The take-out port means may be associated with valve means which is opened in idling engine operation. For the purpose, the valve means may be interconnected with the engine throttle valve or controlled by means of the engine intake pressure. The arrangement has been found effective to reduce or eliminate squish flow directed to the ignition means at or around the end of the compression stroke whereby the possibility of the combustion flame being extinguished can be minimized.

According to a preferable mode of the present invention, discharge port means is provided in the casing to open to the working chamber which is in the exhaust stroke. The discharge port means is located at a side of the exhaust port means extending in the direction of a rotor rotation and connected with the take-out port means so that the compressed gas is discharged in the idling and light load engine operation through the working chamber which is being displaced from the exhaust zone to the intake zone. With this arrangement, it is possible to decrease the amount of combustion gas which is carried-over into the intake zone.

Alternatively, such discharge port means may be provided in intake passage means which lead to the intake port means. This arrangement is considered as being advantageous over the aforementioned arrangement because there will be less possibility that the discharge port means is clogged by sludges although there may be a decrease in the effect of decreasing combustion gas carry-over.

In two rotor type rotary piston engines comprising two casings and two rotors which are adapted to rotate with 180° phase difference, it is preferred to connect the take-out port means in one of the casings to the discharge port means in the other casing.

The above and other objects and features of the present invention will become apparent from the following descriptions taking reference to the accompanying drawings, in which.

Figure 4:
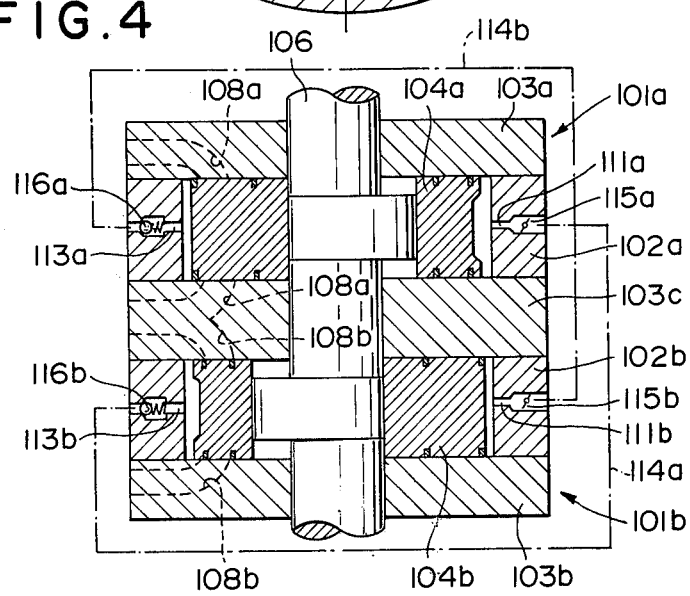
FIG. 4 is a longitudinal section of a two rotor type rotary piston engine embodying the features of the present invention.
Figure 6:
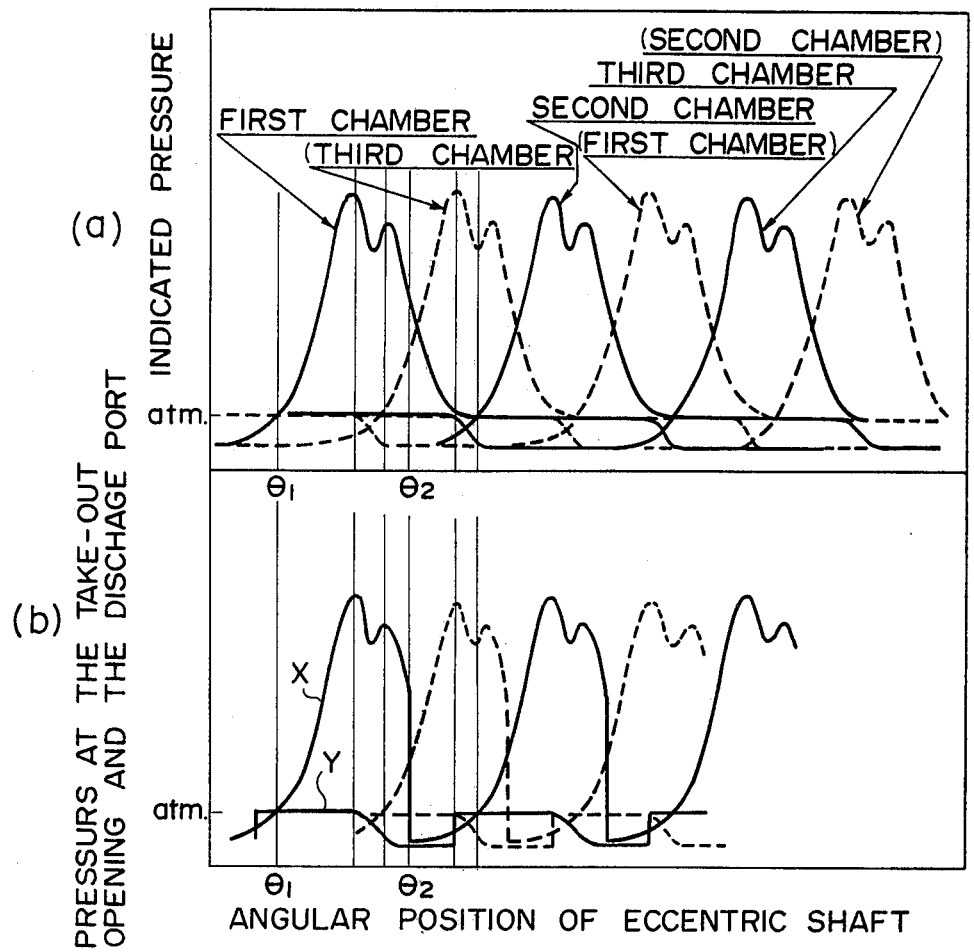

FIGS. 5(a), (b) and (c) diagrammatically show the operation of the engine shown in FIG. 4;

FIG. 6 is a pressure indicator diagram of the two rotor type engine; and

Figure 7:
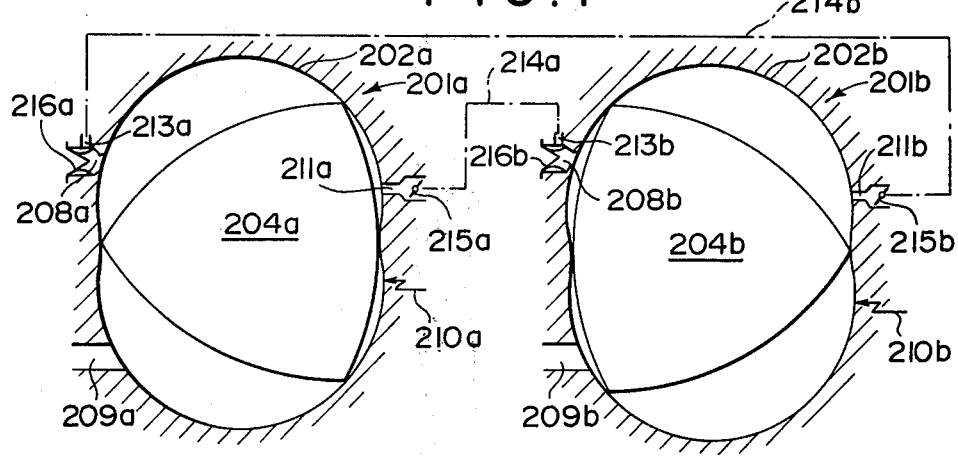

FIG. 7 is a diagrammatical view of a rotary piston engine in accordance with a further embodiment of the present invention.

Figure 1:
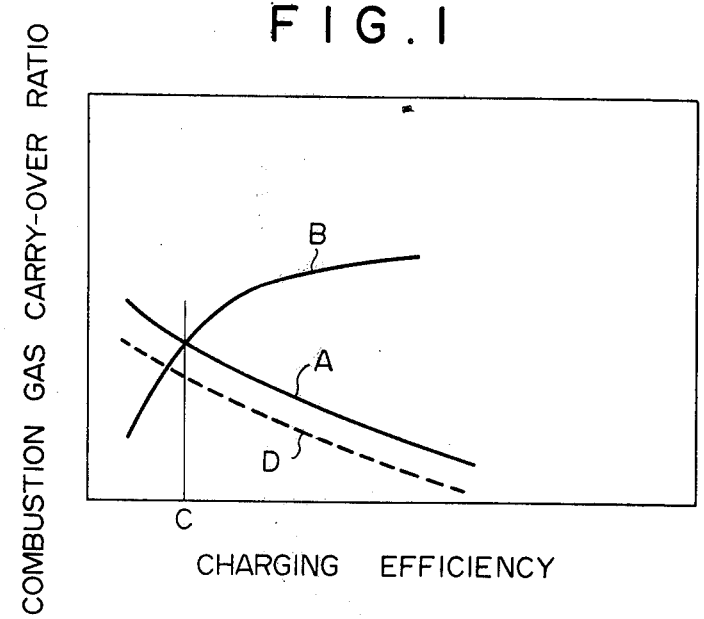
FIG. 1 is a diagram showing the relationship between the actual and allowable limit of the combustion gas carry-over ratios and the changing efficiency.

Referring first to FIG. 1, there is shown in diagram the relationship between the combustion gas carry-over ratio and the charging efficiency of the engine. In FIG. 1, it will be seen that the combustion gas carry-over ratio gradually decreases as the engine charging efficiency increases as shown by a curve A. The allowable limit of such carry-over ratio however decreases in response to a decrease in the engine charging efficiency. Particularly, the allowable limit of the carry-over ratio steeply decreases as the engine charging efficiency decreases below a certain point as shown in a curve B. Thus, the engine charging efficiency must be maintained beyond a value C where the actual carry-over ratio curve A crosses the allowable limit curve B.

Figure 3:
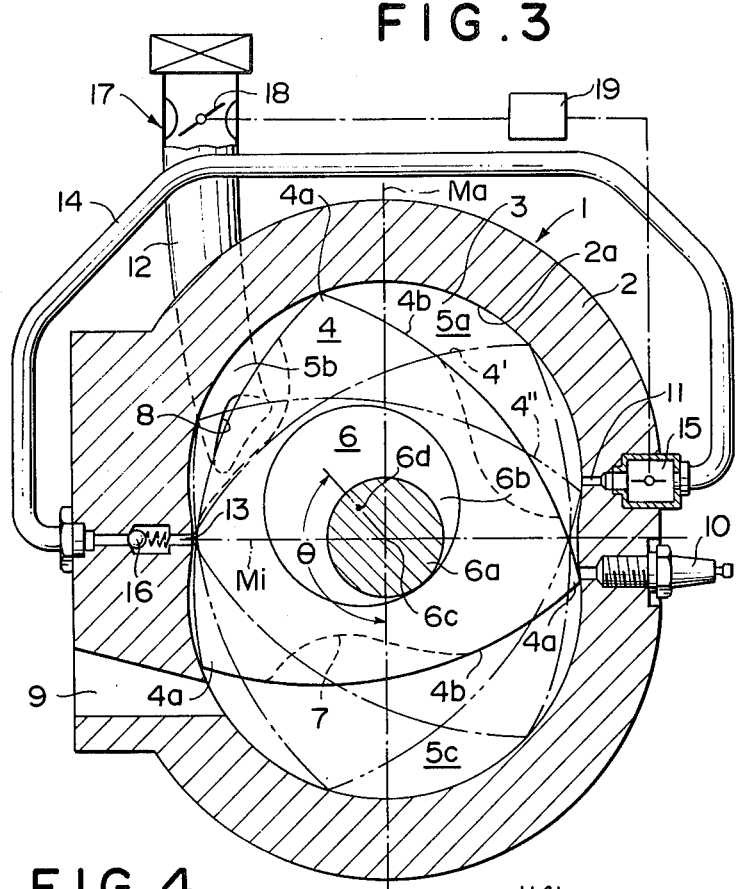
FIG. 3 is a sectional view showing a rotary piston engine in accordance with one embodiment of the present invention.

Referring now to FIG. 3, the rotary piston engine shown therein comprises a casing 1 which includes a rotor housing 2 having an inner wall 2a of trochoidal configuration and a pair of side housings 3 secured to the opposite sides of the rotor housing 2 although only one of the side housings 3 is shown in the drawing. In the casing 1, there is disposed a substantially triangular rotor 4 which is rotatable in the casing with apex portions 4a in sliding contact with the inner wall 2a of the rotor housing 2. Thus, there are defined in the casing 1 working chambers 5a, 5b and 5c of variable volume between flanks 4b of the rotor 4 and the inner wall 2a of the rotor housing 2. The rotor 4 may be formed with a recess 7 on each of flanks 4b.

The triangular rotor 4 is supported by an eccentric shaft 6 having an output shaft portion 6a and an offset rotor support portion 6b. The output shaft portion 6a has an axis of rotation 6c which is co-axial with the center axis of the trochoid and the rotor support portion 6b has an axis 6d which is offset from the axis 6c of the output shaft portion 6a but co-axial with the center of the rotor 4. The trochoid which defines the inner wall 2a of the rotor housing 2 has a major axis $M_a$ and a minor axis $M_i$ and the angular position of the triangular rotor 4 can be designated in terms of an angle $\theta$, for example, between the major axis $M_a$ and a line passing through the axes 6c and 6d of the eccentric shaft 6. Such angle $\theta$ may hereinafter be referred to as the angular position of the eccentric shaft.

In the illustrated embodiment, one of the side housings 3 is formed with an intake port 8 and the rotor housing 2 is provided with an exhaust port 9 and an ignition plug 10. The ignition plug 10 is located at the leading side of the minor axis $M_i$, that is, the side of the minor axis $M_i$ extending in the direction of the rotor rotation. The intake port 8 is connected with an intake passage 12 which is provided with a carburetor device 17 having a throttle valve 18.

In the illustrated arrangement of the engine, the rotor housing 2 is formed with an opening 11 for drawing compressed gas from one of the working chambers 5 which is in compression stroke. According to the present invention, the opening 11 is located to open to such compression working chamber 5 at least when it is in the compression top dead center wherein it possesses the minimum volume. Further, it must also be located at the trailing side of the minor axis Mi, that is, the side of the minor axis opposite to the direction of rotor rotation.

The opening 11 is connected through a valve 15 with a conduit 14 which is in turn connected through a one-way valve 16 with a discharge port 13. The discharge port 13 is located in this embodiment at a position slightly offset from the minor axis Mi toward the exhaust port 9 so that the compressed gas drawn from the compression working chamber 5 through the opening 11 is discharged into the working chamber 5 which is in the exhaust stroke. The discharge port 13 may be located at any position in the leading side of the exhaust port 9, provided that it can discharge the compressed gas into the exhaust working chamber. In order to return as much compressed gas as possible to the exhaust working chamber, it is recommendable to locate the discharge port 13 close to the exhaust port 9, however, it will not be advisable to locate the port 13 very close to the exhaust port 9 because the compressed gas discharged through the port 13 may be allowed to flow through the exhaust port 9 out of the engine.

The valve 15 is connected with a control device 19 which is in turn interconnected with the engine throttle valve 18, so that the valve 15 is opened only in the idling and light load engine operation. Thus, in operation under idling and light load, the working chamber 5 in the intake stroke draws a small amount of air or air-fuel mixture through the intake port 8. Then the working chamber 5 is shifted to the compression zone where the volume of the chamber 5 is decreased in response to a rotation of the rotor 4. Thus, the pressure in this chamber 5 increases to the atmospheric pressure at about 150° to 180° of the angular position of the eccentric shaft after the intake bottom dead center where it possesses the maximum volume. This rotor position is shown by the solid line in FIG. 3.

Figure 2:
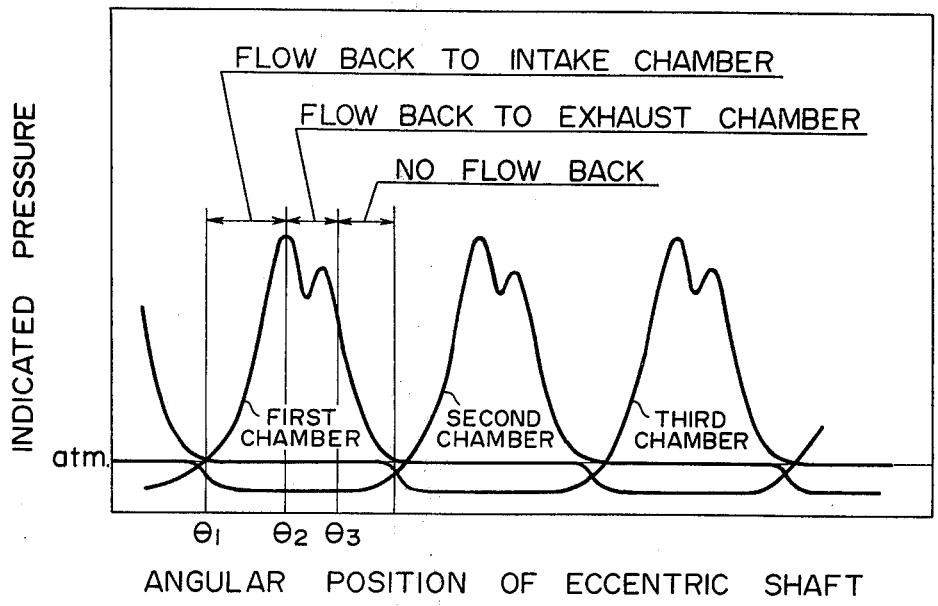
FIG. 2 is a pressure indicator diagram for a typical single rotor type rotary piston engine.

Referring now to the pressure indicator diagram in FIG. 2, the first working chamber 5a is in the initial stage of compression stroke and the atmospheric pressure is restored therein at the eccentric shaft angular position of $\theta_1$. The second working chamber 5b is in the initial stage of the intake stroke and a suction pressure is prevailing in this chamber. The third working chamber 5c is in the exhaust stroke and the chamber is under the atmospheric pressure.

In this position, the opening 11 is in communication with the first working chamber 5a while the discharge port 13 is in communication with the second working chamber 5b. Thus, the gas in the first working chamber 5a is partially returned through the opening 11 and the port 13 to the second working chamber 5b under the pressure difference. This flow back to the second working chamber 5b is continued until the rotor 4 has rotated to the position shown by the dotted line 4' where the discharge port 13 is brought out of communication with the second working chamber 5b and opened to the third working chamber 5c. This position is also shown in FIG. 2 by the angular position $\theta_2$ of the eccentric shaft.

As soon as the discharge port 13 is opened to the third working chamber 5c, the compressed gas in the first chamber 5a then flows into the third working chamber 5c which is in the exhaust stroke. Thus, the combustion gas in the leading part of the third working chamber 5c is replaced by the gas returned from the first working chamber 5a. Such flow back of the compressed gas continues until the rotor 4 has rotated to a position shown by dotted lines 4" in FIG. 3 wherein the opening 11 no longer opens to the first working chamber 5a. This position is also shown by the angular position $\theta_3$ in FIG. 2. In this position, although the opening 11 is in communication with the second working chamber 5b, any flow back of the compression gas from the second chamber 5b to the third chamber 5c will not be produced since the pressure in the second working chamber 5b is still lower than that in the third working chamber 5c.

From the above descriptions, it will be understood that, in the above arrangement, the compression gas returned from the compression working chamber occupies a part of the volume of the working chamber at the end of the exhaust stroke to take the position of the combustion gas which otherwise would be carried to the intake zone as the rotor rotates. Thus, the amount of the carried-over combustion gas can be significantly decreased as shown by the curve D in FIG. 1.

Flow back of the compression gas to the intake working chamber does not have any contribution to the reduction of the amount of the carried-over combustion gas but may decrease a room for a charge of fresh intake gas so that it is recommendable to limit such flow back to the intake working chamber as small as possible.

The aforementioned arrangement provides a further advantage in that by drawing the compressed gas out of the compression working chamber the engine efficiency can be correspondingly decreased and therefore it becomes possible to introduce correspondingly increased amount of intake gas in the intake stroke. Thus, the combustion gas carry-over ratio can further be decreased. Further, since the compressed gas is partly allowed to flow out of the compression working chamber at the opening 11, the squish flow of the mixture which is directed from the trailing side to the leading side of the working chamber is weakened to such an extent that any possibility of combustion flame being extinguished by the squish flow can be eliminated.

The compressed gas in the compression working chamber 5 is ignited at an appropriate time by the plug 10, however, the squish flow from the trailing side to the leading and an extremely flat configuration of the working chamber prevent the combustion flame from being propagated to the area of the opening 11. Therefore, there is no danger of combustion flame being allowed to go out through the opening 11.

Figure 5:
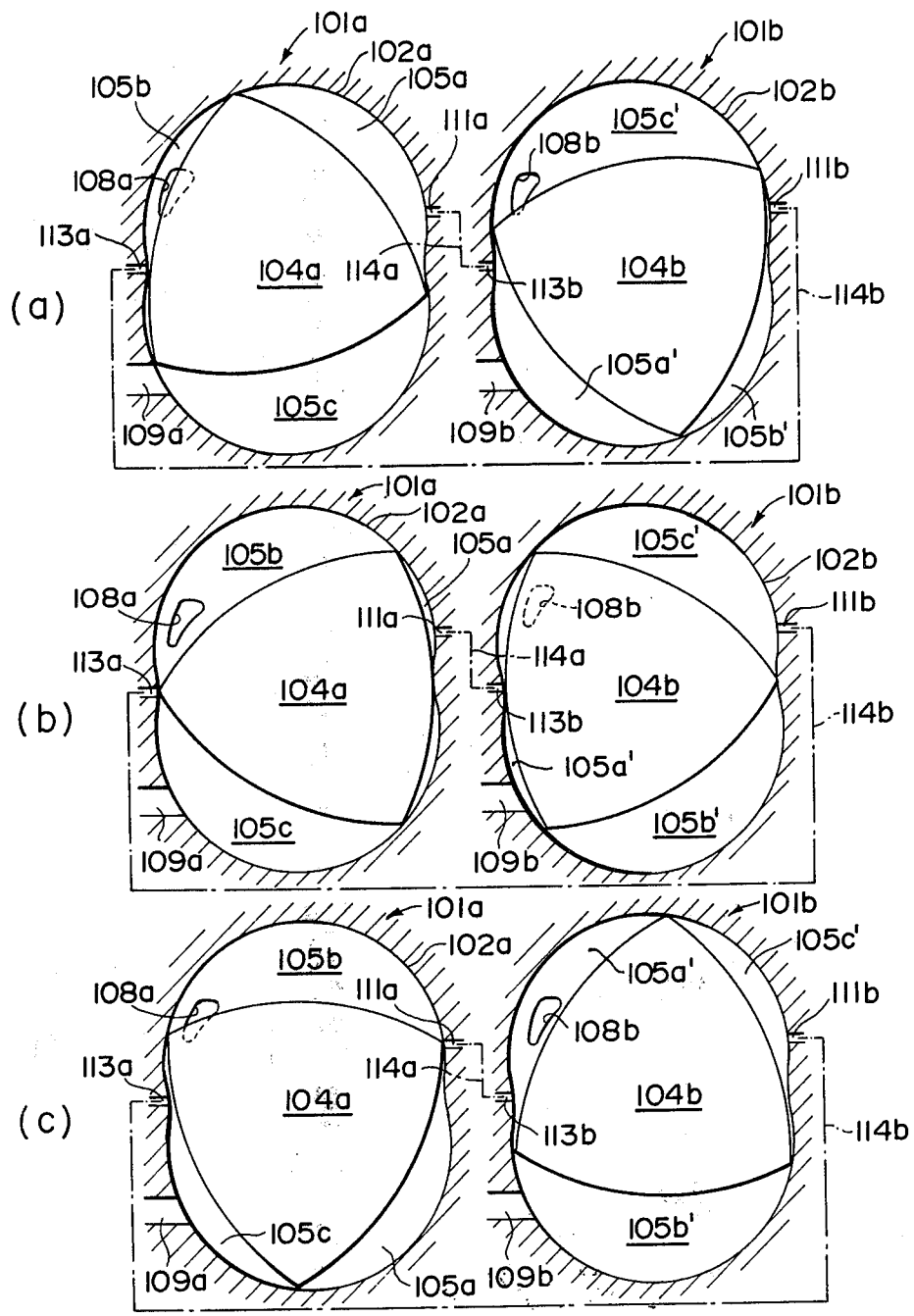

Referring now to FIGS. 4 and 5 which show a further embodiment in which the principle of the present invention is applied to a multiple rotor type engine. The illustrated rotary piston engine includes a first and a second casings 101a and 101b which respectively comprise a first and second rotor housings 102a and 102b. A side housing 103a is secured to one side of the first rotor housing 102a and the other side of the first rotor housing 102a is attached to one side of a common side housing 103c. The second rotor housing 102b is attached at one side to the other side of the common side housing 103c and has a further side housing 103b secured to the other side.

Each of the rotor housings 102a and 102b has an inner wall of trochoidal configuration and substantially triangular rotors 104a and 104b are disposed in the rotor casings 101a and 101b for rotation with apex portions in sliding engagement with the trochoidal inner walls of the corresponding rotor housings. Thus, working chambers 105 of variable volume are defined in the casings. The rotors 104a and 104b are supported by an eccentric shaft 106 in a manner well known in the art so that they are rotated simultaneously with 180° phase difference.

The side housings 103a, 103b and 103c are formed with intake ports 108a and 108b for the first and second casings 101a and 101b, respectively, and the rotor housings 102a and 102b are formed with exhaust ports 109a and 109b each of which is so located that it is brought out of communication with a working chamber 60° after the intake top dead center in terms of the angular position of the eccentric shaft.

As in the previous embodiments, the rotor housings 102a and 102b are respectively provided with openings 111a and 111b having associated valves 115a and 115b for drawing compressed gas from the compression working chamber. The rotor housings 102a and 102b are also formed with discharge ports 113a and 113b having check valves 116a and 116b. As in the previous embodiment, the valves 115a and 115b may be interconnected with the engine throttle valves (not shown) so that they are opened only in idling and light load engine operation.

In this embodiment, the opening 111a in the first rotor housing 102a is connected through a conduit 114a with the discharge port 113b in the second rotor housing 102b. Similarly, the opening 111b in the second rotor housing 102b is connected through the discharge port 113a in the first rotor housing 102a.

Referring now to FIG. 6a, there are shown changes in pressures in the working chambers. In the drawing, the solid lines are for the working chambers in the first casing 101a and the broken lines for the working chambers in the second casing 101b. FIG. 6b shows changes in pressure at the openings 111a and 111b and at the discharge ports 113a and 113b. The pressure at the opening 111a in the first rotor housing 102a is shown by the curve X and that at the port 113b in the second rotor housing 102b by the curve Y.

Considering first the rotor position as shown in FIG. 5a which can also be designated by the angular position $\theta_1$ of the eccentric shaft, the pressure in the first working chamber 105a of the first casing 101a is substantially at the atmospheric pressure as discussed with relation to the previous embodiment. In the first casing 101a, the second working chamber 105b is in the beginning of the intake stroke so that suction pressure is prevailing in the chamber. The third working chamber 105c is in the exhaust stroke so that the pressure in this chamber is substantially equal to the atmospheric pressure.

In this position, the opening 111a in the first casing 101a connects the first working chamber 105a through the discharge port 113b to the first working chamber 105a' of the second casing 101b which is in the exhaust stroke. The pressure in the first working chamber 105a soon increases above the atmospheric pressure after the rotors 104a and 104b have rotated beyond the positions shown in FIG. 5a so that compressed gas is drawn from the chamber 105a and discharged to the chamber 105a'. Such discharge of compressed gas to the exhaust working chamber 105a' is continued until the eccentric shaft 106 is rotated to the position $\theta_2$ wherein the opening 111a in the first casing 101a is brought out of communication with the first working chamber 105a and into communication with the second working chamber 105b. However, since the pressure in the second chamber 105b of the first casing 101a is below the atmospheric pressure at this instance, flow of compressed gas from the first casing 101a to the second casing 101b is terminated at the moment.

The embodiment is considered as being advantageous over the previous embodiment in that a discharge of compressed gas or mixture to a working chamber in exhaust stroke can be maintained for a longer period as compared with the single rotor arrangement in the previous embodiment, so that an increased amount of combustion gas can be replaced by fresh gas resulting in a significant decrease in the carry-over ratio. The embodiment is further advantageous in that the compressed gas can be discharged to the exhaust working chamber both before and during the overlap period.

The openings 111a and 111b are located in such a manner that they open to the working chamber at the compression top dead center. In other words, each of the openings 111a and 111b is positioned between the minor axis of the trochoid and the trailing apex portion of the rotor at the compression top dead center and, preferably, at a position slightly offset toward leading side from the center between the minor axis of the trochoid and the trailing apex portion of the rotor. More specifically, it is preferred to locate the opening so that it is brought out of communication with the working chamber at a position 105° after the compression top dead center in terms of the angle of rotation of the eccentric shaft.

The position of the discharge port 113a or 113b may be determined so that it is at the leading side of the exhaust port 109a or 109b and opens to the working chamber which is in communication with the exhaust port. It is preferred, however, that the discharge port is located in an area extending between a point offset by 60° toward leading side and a point offset by 90° toward trailing side from the minor axis of the trochoid.

Referring now to FIG. 7 which shows a further embodiment of the present invention, the rotary piston engine shown therein has arrangements which are substantially the same as those in the previous embodiment, so that detailed descriptions of this embodiment will not be repeated.

In this embodiment, the first and the second casings 201a and 201b comprise rotor housings 202a and 202b, respectively, which are formed with intake ports 208a and 208b, respectively. The intake ports 208a and 208b are provided with reed type one way valves 216a and 216b, respectively. Discharge ports 213a and 213b open to the intake ports 208a and 208b, respectively. As in the previous embodiment, the discharge port 213a in the intake port 208a of the first casing 201a is connected through a conduit 214b with the opening 211b in the rotor housing 202b of the second casing 201b. Similarly, the discharge port 213b in the intake port 208b of the second casing 201b is connected through a conduit 214a with the opening 211a in the rotor housing of the first casing 201a.

This arrangement is considered as being advantageous in that there is no or least possibility that the discharge ports 213a and 213b are clogged by sludges that may be produced during engine operation.

The invention has thus been shown and described with reference to specific embodiments, however, it should be noted that the invention is in no way limited to the details of the illustrated structures but changes and modifications may be made without departing from the scope of the appended claims. For example, the valves associated with the compressed gas take-out openings should not necessarily be controlled in response to the actuation of the engine throttle valve but may be controlled by the engine intake pressure and/or engine speed. Further, the one-way valves associated with the discharge ports may be omitted since there is substantially no or only very little, if any, chance of reverse flow through the discharge ports.

We claim:

1. Rotary piston engine comprising a casing which includes a rotor housing having an inner wall of trochoidal configuration and a pair of side housings secured to the opposite sides of the rotor housing to define a rotor cavity of trochoidal configuration having a major and a minor axis, and a substantially polygonal rotor disposed in the rotor cavity for rotation with apex portions in sliding contact with the inner wall of the rotor housing to define, between the inner wall of the rotor housing and flanks of the rotor, working chambers which are displaced along the inner wall of the rotor housing as the rotor rotates with volumes varying in response to the rotation of the rotor through intake, compression, expansion and exhaust strokes, intake port means provided in said casing to open to one of the working chambers which is in the intake stroke, exhaust port means provided in said casing to open to another working chamber which is in the exhaust stroke, ignition means provided in the casing for igniting compressed air-fuel mixture, mixture take-out port means provided in said casing to open to the working chamber which is at the end of the compression stroke wherein the working chamber possesses the minimum volume, mixture discharge port means provided in said casing to open to the working chamber which is in the exhaust stroke, said mixture take-out port means being located at a side of the minor axis of the trochoid opposite to the rotor rotation to draw a part of the compressed mixture in the working chamber in the compression stroke and being connected with said mixture discharge port means.

2. Rotary piston engine in accordance with claim 1 in which said ignition means is located at a leading side in the direction of rotor rotation with respect to the minor axis of the trochoid.

3. Rotary piston engine in accordance with claim 2 in which said ignition means is located at a leading side in the direction of rotor rotation with respect to the minor axis of the trochoid.

4. Rotary piston engine in accordance with claim 1 in which said discharge port means is located at a side in the direction of the rotor rotation with respect to the exhaust port means.

5. Rotary piston engine in accordance with claim 4 in which said discharge port means is located at a position slightly offset from the minor axis toward the exhaust port means.

6. Rotary piston engine in accordance with claim 1 in which said take-out port means is associated with valve means which is controlled in accordance with engine operating condition so that it is opened in idling and light load engine operation.

7. Rotary piston engine in accordance with claim 6 in which said valve means is interconnected with engine throttle valve means.

8. Multiple rotor type rotary piston engine comprising a first casing having a first trochoidal rotor cavity therein, a first substantially polygonal rotor disposed rotatably in the first rotor cavity to define working chambers which are peripherally displaced in response to the rotation of the rotor with volumes varying through intake, compression, expansion and exhaust strokes, first intake port means provided in said first casing to open to one of the working chambers which is in the intake stroke, first exhaust port means provided in said first casing to open to another working chamber which is in the exhaust stroke, first ignition means provided in the first casing for igniting compressed air-fuel mixture in the working chamber which is in the compression stroke, first mixture take-out port means provided in said first casing to open to the working chamber which is at the end of the compression stroke wherein the working chamber possesses the minimum volume, said first take-out port means being located at a side opposite to the rotor rotation with respect to minor axis of trochoid of the first rotor cavity, first discharge port means provided in said first casing to open to the working chamber which is in the exhaust stroke, a second casing having a second trochoidal rotor cavity therein, a second substantially polygonal rotor disposed rotatably in the second rotor cavity to define working chambers which are peripherally displaced in response to the rotation of the rotor with volumes varying through intake, said second rotor being adapted to rotate with 180° phase difference with respect to the first rotor, compression, expansion and exhaust strokes, second intake port means provided in said second casing to open to one of the working chambers which is in the intake stroke, second exhaust port means provided in said second casing to open to another working chamber which is in the exhaust stroke, second ignition means provided in the second casing for igniting compressed air-fuel mixture in the working chamber which is in the compression stroke, second mixture take-out port means provided in said second casing to open to the working chamber which is at the end of the compression stroke wherein the working chamber possesses the minimum volume, said second take-out port means being located at a side opposite to the rotor rotation with respect to minor axis of trochoid of the second rotor cavity, second discharge port means provided in said second casing to open to the working chamber which is in the exhaust stroke, said first take-out port means being connected with said second discharge port means, said second take-out port means being connected with said first discharge port means.

9. Rotary postion engine in accordance with claim 8 in which said first and second take-out port means are associated with valve means which are adapted to be controlled in accordance with operating condition of the engine so that they are opened in idling and light load engine operation.

10. Rotary piston engine in accordance with claim 8 in which each of said first and second discharge port means is located between 60° toward leading side and 90° toward trailing side with respect to the respective minor axis of the trochoid in terms of angle of rotation of eccentric shaft supporting the rotors.

11. Rotary piston engine in accordance with claim 8 in which each of said first and second take-out port means is located such that it is brought out of communication with each working chamber at about 105° C after compression dead center in terms of angle of rotation of eccentric shaft supporting the rotors.

12. Rotary piston engine in accordance with claim 8 in which first and second intake port means are of peripheral type and the first and second discharge port means are respectively opened to the first and second intake port means.

13. Rotary piston engine in accordance with claim 8 in which said first and second mixture takeout port means and said first and second discharge port means are so located that discharge of compressed gas to each exhaust working chamber can be continued before and during overlap period wherein the exhaust port means communicates both to the intake and exhaust working chambers.

* * * * *